(12) United States Patent
Chapman (10) Patent No.: US 10,805,488 B1
(45) Date of Patent: Oct. 13, 2020

(54) APPARATUS AND METHOD FOR MANAGING THE LANGUAGE USED FOR DOCUMENTATION IN A MULTI FUNCTION DEVICE

(71) Applicant: Xerox Corporation, Norwalk, CT (US)

(72) Inventor: Edward Chapman, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 16/535,287

(22) Filed: Aug. 8, 2019

(51) Int. Cl.
*G06F 15/00* (2006.01)
*G06F 3/12* (2006.01)
*G06K 1/00* (2006.01)
*H04N 1/00* (2006.01)
*G06F 40/58* (2020.01)
*G06F 40/263* (2020.01)

(52) U.S. Cl.
CPC ....... *H04N 1/00506* (2013.01); *G06F 40/263* (2020.01); *G06F 40/58* (2020.01); *H04N 1/00408* (2013.01); *H04N 1/00503* (2013.01)

(58) Field of Classification Search
CPC ........... H04N 1/00506; H04N 1/00408; H04N 1/00503; G06F 40/58; G06F 40/263
USPC .................................................. 358/1.13, 1.1
See application file for complete search history.

(56) References Cited

U.S. PATENT DOCUMENTS

2012/0271621 A1* 10/2012 Jia .......................... G06F 9/454
704/8
2019/0188267 A1* 6/2019 Yoshioku ................ G06T 11/60

* cited by examiner

*Primary Examiner* — Douglas Q Tran
(74) *Attorney, Agent, or Firm* — Jones Robb, PLLC (57) ABSTRACT

Systems, methods, and devices are configured to manage the language used for documentation in a multi-function device (MFD). They include providing a message to a user, the message comprising a selection to choose a language as part of the initialization of the MFD. They also include receiving an input including the language chosen by the user. They further include determining if the language chosen by the user matches a default language in the MFD and modifying code associated with settings in electronic documentation to enable use of the language chosen by the user during the initialization in place of the default language in the electronic documentation when it is determined that the language chosen by the user does not match the default language, the electronic documentation providing information to the user for operation of the MFD.

18 Claims, 8 Drawing Sheets

APPARATUS AND METHOD FOR MANAGING THE LANGUAGE USED FOR DOCUMENTATION IN A MULTI FUNCTION DEVICE

TECHNICAL BACKGROUND

Printer systems, such as printers, printer/scanners, and multi-function devices (MFDs), allow users to create and submit a processing job, such as a print job, a copy job, or a scan job, from a physical or electronic document and produce an output as a physically printed or electronic ready-to-print document These printer systems are often networked as part of a home or office network configured to allow a user access to any one of the printer systems. Networked printer systems also allow the user to access or create an electronic document from a job created as a print job, copy job, or scan job on one printer system and print the electronic document on any other printer system on the network. Printer systems are an important part of a productive home or office environment.

The printer systems often include information pages or documentation on how to use, service, and/or troubleshoot issues associated with their operation. The information pages or documentation may be in a viewable and/or printable electronic format, such as a portable document file format, and may be available in multiple versions, for instance in multiple languages. For each language that is available, a separate electronic file is usually created having an appropriate language translation of the information page or documentation. The printer system may allow a user to select a language for the information pages or documentation when selecting or requesting the information pages or documentation or may allow a separate general selection for all information pages or documentation. When the language is selected, the printer system selects the correct electronic file for the selected language. The printer system may also initially operate or use a default, initial, or nominal language (e.g., English).

Maintaining information pages or documentation as separate electronic files (e.g., portable document format file) for a large number of languages can be expensive and inefficient, especially as printer systems become more and more complex and/or more and more languages are required to be supported. The separate electronic files occupy a significant amount of memory or storage in the printer system, increasing cost and complexity. It is possible to support a plurality of different languages in a single electronic file using some form of layering for the data representing the text for the different languages. The viewable and/or printable layers may be selected or activated as part of creating and managing the file in a content creation program, such as programs from Microsoft, Adobe, and others. However, printing systems often do not include a content creation program due to its large size and is not normally needed for any other operation. Instead, printing systems include a relatively low functionality and smaller size content viewing (only) program. These content viewing programs do not include functionality to unlock or enable and disable printable or viewable layers in order to minimize the size of the memory used for the content viewing program. Further, the metadata associated with creating and managing these layers may differ for various content creation programs and may not be compatible with all content viewing programs. Therefore, there is a need to address these and other issues associated with managing the language used for information pages or other documentation in printer systems.

OVERVIEW

Exemplary embodiments described herein include methods, systems, and apparatuses for managing the language used for documentation in a multi-function device or apparatus. An exemplary printing or multi-function device includes a user interface that provides a message to a user, the message comprising selection of a language by the user as part of the initialization of the multi-function device. The printing or multi-function device further includes a processor that receives a response to the message from the user interface, the response including the selected language. The processor further determines if the selected language matches a default language in the multi-function device and generates instructions to modify settings in electronic documentation associated with operation of the multi-function device to enable use of the selected language in place of the default language in the electronic documentation when it is determined that the selected language does not match the default language.

An exemplary method includes providing a message to a user, the message including a selection to choose a language as part of the initialization of a multi-function printing device. The method also includes receiving an input from the user, the input comprising the language chosen by the user. The method further includes determining if the language chosen by the user matches a default language in the multi-function printing device and modifying code associated with settings in electronic documentation to enable use of the language chosen by the user during the initialization in place of the default language in the electronic documentation when it is determined that the language chosen by the user does not match the default language, the electronic documentation providing information to the user for operation of the multi-function printing device.

An exemplary apparatus includes a memory for storing electronic file, the electronic file comprising documentation for assisting a user with operation of the apparatus. The apparatus further includes a processor configured to generate instructions to provide a message to a user in conjunction with initialization of the apparatus, the message comprising a selection of a language from a set of languages for operation of the apparatus. The processor is also configured to receive an input from the user, the input comprising the language selected by the user. The processor is further configured to determine if the language selected by the user matches a default language in the apparatus and provide instructions to modify settings to enable the user to at least one of view and print documentation from the electronic file using the language selected by the user when it is determined that the language selected by the user does not match the default language.

BRIEF DESCRIPTION OF THE DRAWINGS

These and other aspects, features, and advantages of the present disclosure will be described or become apparent from the following detailed description of the preferred embodiments, which is to be read in connection with the accompanying drawings.

It should be understood that the drawing(s) are for purposes of illustrating the concepts of the disclosure and are not necessarily the only possible configuration for illustrating the disclosure.

DETAILED DESCRIPTION

The present embodiments are directed towards problems associated with managing the language used for documentation or information pages associated with operating a printing device or MFD. In particular, the present embodiments address issues with minimizing the overhead, such as the memory space, associated with maintaining and providing the documentation or information pages for display or printing on the printing device or MFD. The present embodiment describes a mechanism utilizing a single electronic file with all supported languages that is created using a content creation program external to the printing device or MFD. Data associated with each different language goes in its own optional content layer. All other content, such as document formatting, goes into a separate formatting content layer. This formatting content layer will initially have print and view set to a true state along with one optional content layer established as the initial, nominal, or default language. The other optional content layers will have print and view set to a false state. For purposes of this application, the content layers are any data management structure for the data in an electronic file that is organized to enable selective controlling of any aspect of the visibility, viewability, printability, or exportability of optional portions of the data using inputs such as instructions, software code, metadata, scripts and the like.

As described above, printing devices or MFDs usually do not include a content creation program and instead include a lower functionality content viewing program. The lack of a content creation program creates problems when trying to change the print and view states of the content layers of an electronic file. In the present embodiments, information related to the language that will be used for operation of the printing device or MFD is determined and stored during initialization. If the initial, nominal, or default language selected for printing or viewing documentation or information page is not the same language determined as part of initialization, then the printing device or MFD modifies information associated with the electronic file to change the states of the content layers. For example, software code or metadata associated with the print and view states of the content layer for the selected language are changed to a true state while the print and view states of the content layer for the initial, nominal, or default language are changed to a false state, without changing the print and view states for the content formatting layer.

The implementation of one or more of the aspects of the processes, mechanisms, systems, and devices of the present embodiments allow for changing the language used for documentation or information pages associated with a printing device or MFD by using an input made as part of initialization for operation of the printing device or MFD. The implementation of the present embodiments further allows for changing the language without the use of separate electronic files for each of the languages and without the requirement to include a content creation program to manipulate printable and viewable content layers in an electronic file. The implementation of the present embodiments results in improved efficiency of the operation of the printing device or MFD as well as a reduction of up the number of languages to one in the use of memory for the documentation or information pages and lower cost for the printing device or MFD with respect to previous approaches.

These and additional operations are further described with respect to the embodiments depicted in FIGS. 1-8 below.

Figure 1:
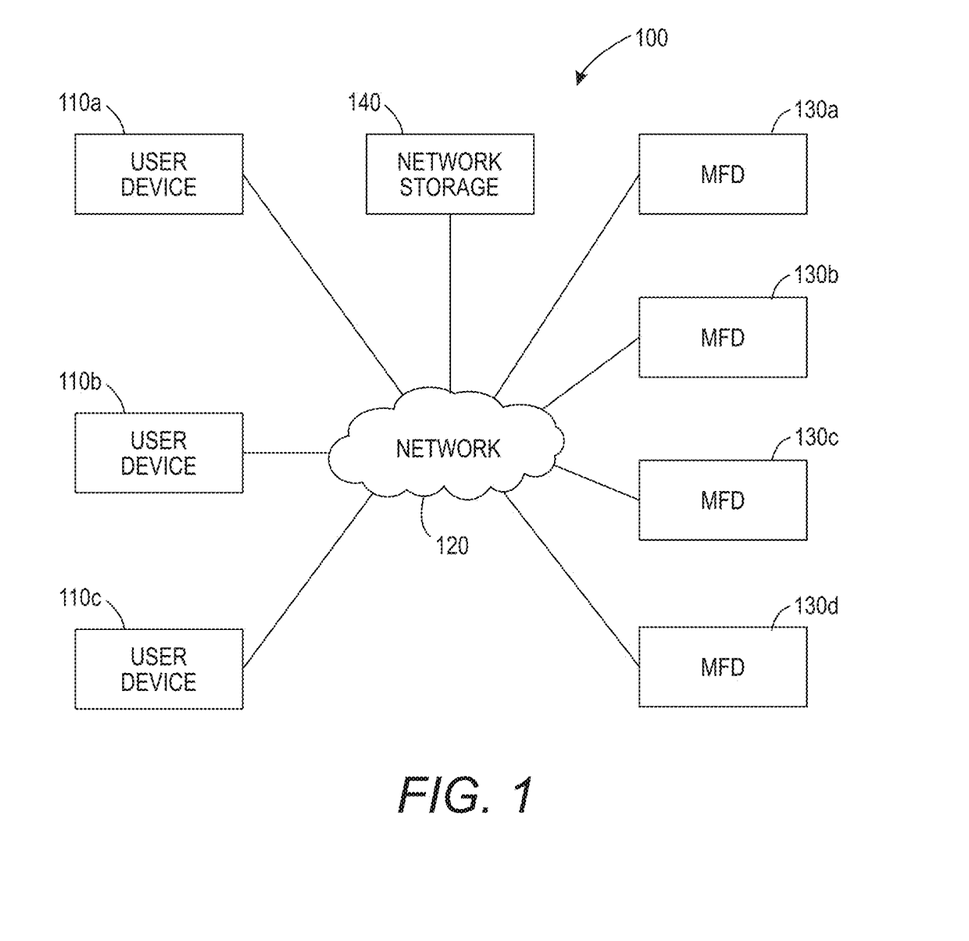
FIG. 1 depicts an exemplary system including aspects for managing the language used for documentation in an MFD.

FIG. 1 illustrates an exemplary system 100 for managing the language used for documentation in an MFD. System 100 includes a plurality of user devices 110*a*-110*c* coupled to a plurality of MFDs 130*a*-130*d* and a network storage 140 through a network 120. User devices 110*a*-110*c*, MFDs 130*a*-130*d*, and network storage 140 may be located throughout sites within the same building or dwelling and connected through one or both of a wired and wireless local area network using a communication protocol including, but not limited to, Institute of Electrical and Electronics Engineers (IEEE) standard 802.3, Wi-Fi, and IEEE standard 802.11. One or more of user devices 110*a*-110*c* and/or network storage 140 may additionally be located in a different or remote facility from the dwelling or building where the one or more of the MFDs 130*a*-130*d* are located. The one or more remotely located user devices 110*a*-110*c* and/or network storage 140 may be communicatively coupled to the one or more MFDs 130*a*-130*d* through a private or public network using a communication protocol including, but not limited to, Internet Protocol or any cellular communication protocols.

In operation, system 100 performs various aspects of a mechanism for managing the language used for documentation in the MFDs 130*a*-130*d*. The mechanism may be performed entirely in one or more of MFDs 130*a*-130*d*. In some instances, some portions of the mechanism may be performed in one or more of user devices 110*a*-110*c* or in network storage 140. The mechanism includes providing a message to a user on the user interface one of the MFDs 130*a*-130*d*. The message is provided as part of the initialization of the one of the MFDs 130*a*-130*s* and includes a selection to choose a language by the user. For purposes of this application, the initialization of a device (e.g., one of the MFDs 130*a*-130*d*) is any form of preparation of the device for operation, including but not limited to operation for the first time, and may include, but is not limited to, running diagnostic tests, loading the operating system, downloading operating parameters, and requesting and receiving operating preferences from a user. A response is received from the user through the user interface on the one of the MFDs 130*a*-130*d*. The response includes a language chosen by the user for use by the one of the MFDs 130*a*-130*d*. For purposes of this application, a user interface is any mechanism by which a user and a device interact that includes, but is not limited to, sending messages and receiving instructions from a user using any known or available input and/or output elements. Also, for purposes of this application, a message is any information unit that a device provides to the user through a user interface (e.g., through a display) that includes, but is not limited to, status of an operation, an error, a request for input from the user, or other condition.

The mechanism further includes determining if the language chosen by the user matches a default language for operation of the one of the MFDs 130a-130d. If it is determined that the language chosen by the user does not match the default language, then code associated with settings in information pages or electronic documentation is modified to enable use of the language chosen by the user during the initialization in place of the default language. The information pages or electronic documentation provides information to the user for operation of the one of the MFDs 130a-130d and may include, but is not limited to, a user guide, a troubleshooting guide, and help information.

In some instances, the information pages or electronic documentation is arranged in a set of content layers. One of the content layers may include a content formatting layer and other content layers may include data representing text in different languages, including the default language. Further, in some instances, the one of the MFDs 130a-130d may be re-initialized or re-started in order to complete the modification of the settings in the information pages or electronic documentation for using the selected language during the initialization.

The user devices 110a-110c may be any one of a personal computer, a laptop computer, a computer network terminal, a tablet, a cellular phone, a smartphone, and the like. User devices 110a-110c may include processors, displays, communication interfaces, user interfaces, and memories, along with various program modules stored in a memory and executed by a processor, to implement specific functions, such as print servers, print drivers, graphic user interface menus, and communication protocols.

MFDs 130a-130d may be any one of a printer, a printer/fax machine, a printer/scanner machine, and the like. MFDs 130a-130d may include one or more processors, a printer mechanism, mechanical printing media processors, a network interface, a user interface, and storage elements, along with various program modules stored in the storage elements and executed by the one or more processors. Further elements and operations related to devices similar to MFDs 130a-130d will be described in further detail below.

Network storage 140 may include one or more storage elements including, but not limited to, single hard drives, parallel connected or redundant array of independent disks (RAID) drives, optical drives, and solid-state drives using static or dynamic storage mechanisms. Network storage 140 may be located in one location as part of one device or may be distributed across a number of devices and/or distributed across a number of locations. In some embodiments, all or a portion of network storage 140 may operate on a network external to network 120 or in the cloud and be interfaced to user devices 110a-110c and/or MFDs 130a-130d as described above.

Figure 2:
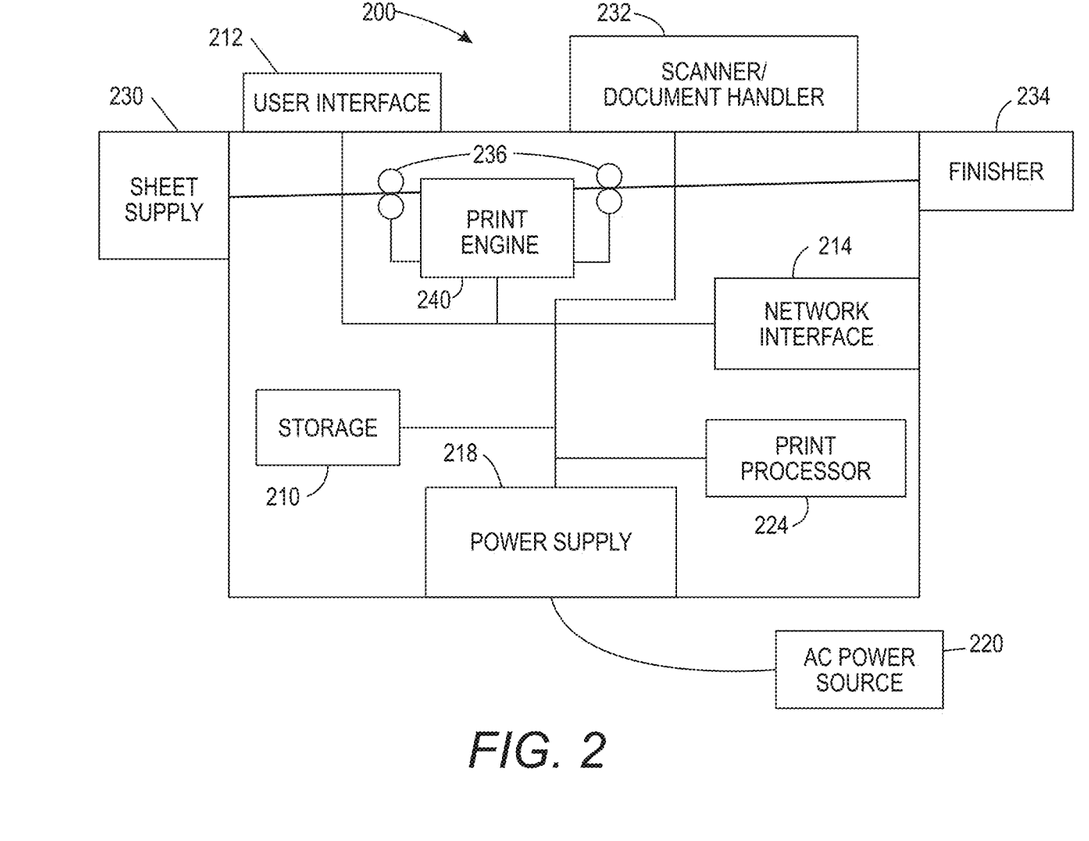
FIG. 2 depicts an exemplary multi-function device including aspects for managing the language used for documentation in an MFD.

FIG. 2 illustrates an exemplary MFD 200, which can be used for managing the language used for documentation in the MFD. MFD 200 may operate in a manner similar to MFDs 130a-130d described in FIG. 1. MFD 200 may also be embodied as, or incorporated in, a printer, copier, multi-function machine, or other device that includes the capability to print, scan, and/or copy a document, including an electronic document, on a physical printable and/or readable media, such as paper. MFD 200 includes a marking device or printing engine 240 capable of printing markings on sheets of print media, a print processor 224 operatively coupled to the printing engine 240 and scanner/document handler 232, a user interface 212 operatively coupled to the print processor 224, and a network interface 214 operatively coupled to the print processor 224 and printing engine 240. A storage element 210 is also operatively coupled to network interface 214, print processor 224, and printing engine 240. Printing engine 240 is also operatively coupled to sheet supply 230, scanner/document handler 232, media path 236, and finisher 234. Power supply 218 receives input from power source 220 and provides power to components in MFD 200 including storage element 210, network interface 214, print processor 224, and printing engine 240. Other elements may be included in MFD 200 but are not described here in the interest of conciseness.

In operation, print processor 224 communicates instructions to user interface 212 to display a message to a user. The message includes a menu or other selection mechanism for the user to select a language associated with operation of MFD 200. The message may be provided as part of the initial start-up or first time of operation of MFD 200 or may be part of a menu included as part of normal operation of MFD 200. Print processor 224 further receives a response to the message, provided through user interface 212, that includes the language selection entered by the user. Print processor 224 further determines if the language selection entered by the user matches either the default language initially configured for operation of MFD 200 or the current language used for operation of MFD 200 if the current language is not the default language. Print processor additionally generates instructions to modify settings in documentation associated with operation of MFD 200 to enable use of the language selection made by the user in place of the default language in conjunction with the electronic documentation when it is determined that the language selection made by the user does not match the default or current language. The modification of the settings allows the user to view and/or print the documentation in the language selected by the user.

In some instances, print processor 224 may initiate a restart sequence of MFD 200 in order to complete the modification process for the settings in the electronic documentation. For purposes of this application, restart sequence is any shutting down, disabling, or closing out of one or more of the elements of a device (e.g., MFD 200) followed by any starting up, enabling, or opening up of the same one or more elements performed in a manner to reset any or all operations of the device. Further information related to the settings in the electronic documentation and modification of those settings to change the language used for viewing and/or printing will be described in detail below.

Print processor 224 may also be referred to as an image processor and operates in a different manner than a general purpose processor because it is specialized for processing image data. A printing mechanism is initiated by instructions in signals communicated from print processor 224 to printing engine 240. Media path 236 is positioned to supply continuous media or sheets of print media (e.g., paper, cardstock, or velum) from sheet supply 230 to the marking device(s) included in printing engine 240. After printing engine generates and applies various markings to sheets of print media, the sheets may optionally pass to finisher 234 which can flip, fold, staple, sort, collate etc., the various printed sheets based on the additional information associated with printing the electronic document.

Printing engine 240 may include any marking device that applies a marking material (e.g., toner, inks, etc.) to continuous print media or sheets of print media, whether currently known or developed in the future and can include, for example, devices that use a photoreceptor belt or an intermediate transfer belt or devices that print directly to print media (e.g., inkjet printers, ribbon-based contact printers, etc.). Scanner/document handler 232 may be used for feeding or re-feeding (e.g., in duplex print mode) printed media sheets, either automatically or manually with inputs from a user, in any of the printing, scanning or faxing modes available. Sheet supply 230 may include one or more trays for storing and positioning sheets or other forms print media, such as paper, for entry onto media path 236. Sheet supply 230 may include a bypass tray that allows external print media, such as previously printed pages to be added and entered into media path 236 for marking instead of, or in addition to, any printable media already in sheet supply 230.

As part of operations in MFD 200 (e.g., printing, copying, scanning, or viewing documents), user interface 212 displays one or more menus that may include selectable options that are available to the user. User interface 212 may receive instructions from print processor 224 for displaying the menus and may further provide entry or selection information provided as a response to the menus by the user to print processor 224. As described above, one of the menus displayed on user interface 212 may include a selectable option to choose a language for use with certain operations of MFD 200. In some instances, the menu may be included as part of the initialization of MFD 200. Information related to menus, including a user selectable language menu, will be described in further detail below.

As described above, user interface 212 may also include the ability to display the documentation associated with the operation of MFD 200 for viewing by the user. Examples of the documentation may include, but are not limited to, user guides, troubleshooting guides, and help information. The documentation may be logically grouped (e.g., by type) with each group being stored as a single electronic file in storage 210 using a suitable format, such as a portable document format. The documentation may be displayed in a "print view". A print view is a view that displays the documentation as it would appear on printed media (e.g., paper). User interface 212 may also include a menu or selection entry to allow the user to print the documentation using print engine 240 and associated elements. The menu or selection entry for printing may be included with, or may be separate from, any selection or entry for viewing the documentation. Information related to documentation associated with the operation of an MFD, such as MFD 200, that is displayed on a user interface will be described in further detail below.

As described above, print processor 224 generates instructions to modify the settings in the documentation based on a language selected by the user through user interface 212 in conjunction with the initialization of MFD 200. The modification allows the documentation to be displayed and/or printed in one of the several different available languages where the different languages are included in a single electronic file associated with the documentation. In one approach, the different languages are stored as different layers that can be interchanged through modification of data or metadata within the electronic file. The metadata identifies only one of the layers containing the available languages to use in conjunction with a separate content formatting layer while displaying and/or printing the internal information pages or other documentation. The instructions generated by print processor 224 may comprise a set of strings of binary data with each one of the strings of binary corresponding to the layers used for the different languages. An example of a set of binary strings used for setting the language used for the electronic documentation to the default language (language 0) is shown below:

% language 0 example
15 0 obj<</Name(usen)/Type/OCG/Usage<</Print<</PrintState/ON>>/View<</ViewState/ON>>>>>>endobj
16 0 obj<</Name(Langl)/Type/OCG/Usage<</Print<</PrintState/OFF>>/View<</ViewState/OFF>>>>>>endobj It is important to note that each one of the strings having an identical data size as evidenced by the inclusion of an extra space in line 15 after "ON". The examples presented here use only 10 bytes of memory. An example of a set of binary strings used for setting the language used for the electronic documentation to the language selected by the user (language 1), as described above, is shown below:

% language 1 example
15 0 obj<</Name(usen)/Type/OCG/Usage<</Print<</PrintState/OFF>>/View<</ViewState/OFF>>>>>>endobj
16 0 obj<</Name(Langl)/Type/OCG/Usage<</Print<</PrintState/ON>>/View<</ViewState/ON>>>>>>endobj It is important to note that in the second example above, the changed settings do not take effect until the data or metadata for the electronic file representing the documentation is updated. The electronic file is considered a permanent element in the memory (e.g., or storage 210) and, while the content (e.g., language data scripts, format data scripts) cannot be modified, the data or metadata for the electronic file (e.g., control of which layers may be viewed/printed) may be modified or updated as part of an initialization of the memory of MFD 200. Other mechanisms for modifying the settings for the documentation related to use of different languages are also possible may be used.

In some embodiments, MFD 200 may include a module or processing apparatus that includes a configurable processor, such as print processor 224, along with a memory unit coupled to the processor. The memory unit stores an electronic file. The electronic file includes data representing documentation for assisting a user with operation of the processing apparatus or operation of the MFD 200. The processor is configured to generate instructions to provide a message to a user in conjunction with initialization of the apparatus, the message comprising a selection of a language from a set of languages for operation of the processing apparatus or for operation of MFD 200. The processor is further configured to receive an input from the user, the input comprising the language selected by the user. The processor is additionally configured to determine if the language selected by the user matches a default language, or the current language if it is not the current language, in the processing apparatus or MFD 200 and provide instructions to modify settings to enable the user to view and/or print documentation from the electronic file on MFD 200 using the language selected by the user when it is determined that the language selected by the user does not match the default or current language. In some instances, the processor may also be configured to initiate a restart sequence of the apparatus, the restart sequence completing the modifying of the settings to enable the user to view and/or print documentation from the electronic file using the language selected by the user.

Figure 3:
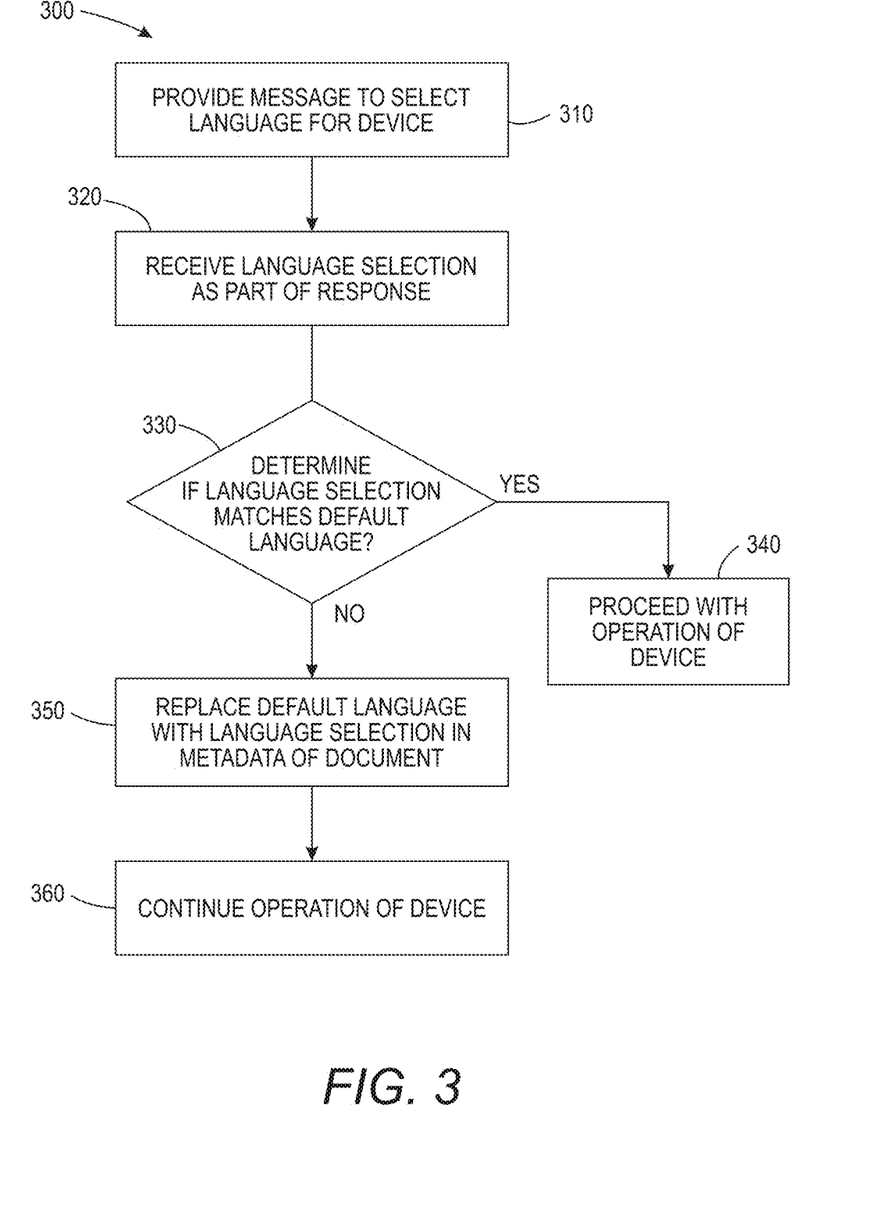
FIG. 3 depicts an exemplary process including aspects for managing the language used for documentation in an MFD.

FIG. 3 illustrates an exemplary process for managing the language used for documentation in an MFD. Process 300 primarily described with respect to a printing device, such as MFD 200 described in FIG. 2. Process 300 may also be performed by a printer in combination with other functions, such MFDs 130a-130d described in FIG. 1. Further, process 300 may be performed in a combination of devices, such as user devices 110a-110c and MFDs 130a-130d described in FIG. 1. Although process 300 depicts steps performed in a particular order for purposes of illustration and discussion, the operations discussed herein are not limited to any particular order or arrangement. One skilled in the art, using the disclosures provided herein, will also appreciate that one or more of the steps of process 300 may be omitted, rearranged, combined, and/or adapted in various ways.

At step 310, a message is provided on a user interface on the MFD (e.g., user interface 212 on MFD 200). The message includes one or more entries for a selection by the user to choose a language. The message is displayed on the user interface as part of the initialization of the MFD. At step 320, a response to the message is received through the user interface. The response includes the language selection chosen by the user from the one or more entries provided, at step 310.

At step 330, a determination is made as to whether the language selection included as part of the response, at step 320, matches a first, nominal, or default language initially used in the MFD (e.g., MFD 200). If, at step 330, the determination is made that the language selection included as part of the response, at step 320, matches the first, nominal, or default language, then at step 340, operation of the MFD proceeds as normal. At step 340, the MFD responds to requests to copy, scan, or print electronic documents. The MFD further provides any internal information pages or other documentation associated with operation, servicing, or maintenance requested by the user for display and/or printing on the MFD using the first, nominal, or default language.

If, at step 330, the determination is made that the language selection included as part of the response, at step 320, does not match the first, nominal, or default language initially used in the MFD (e.g., MFD 200), then at step 350, the first, nominal, or default language is replaced by the language selection included as part of the response. The replacement, at step 350, includes modifying code associated with settings in the electronic documentation to enable use of the language selection in place of the first, nominal, or default language. The replacement, at step 350, the code may be used to reconfigure an electronic file that has the plurality of languages arranged as separate content layers that may be enabled or disabled through metadata for the settings, as described above.

At step 360, after replacing the first, nominal, or default language with the language selection included as part of the response, at step 350, operation of the MFD (e.g., MFD 200) continues in a manner similar to that described at step 340. The MFD responds to requests to copy, scan, or print electronic documents. However, at step 360, The MFD further provides any internal information pages or other documentation associated with operation, servicing, or maintenance requested by the user for display and/or printing on the MFD using the language selection included as part of the response, at step 320 as the current language, in place of the first, nominal, or default language.

It is important to note that not all the steps of process 300 may be required, or one or more steps may be added or modified. For example, an additional step may be added or step 360 may be modified to include initiating of a restart sequence for the MFD by a processor (e.g., processor 224 in MFD 200). The restart sequence may be used to complete the settings modification in the electronic documentation, at step 350, using the language selection included as part of the response, at step 320. Process 300 may additionally be used or modified to be used for changing the current language, the language selection from step 320, used for internal information pages or other documentation on the MFD to a different language (e.g., the first, nominal, or default language described above.

Figure 4:
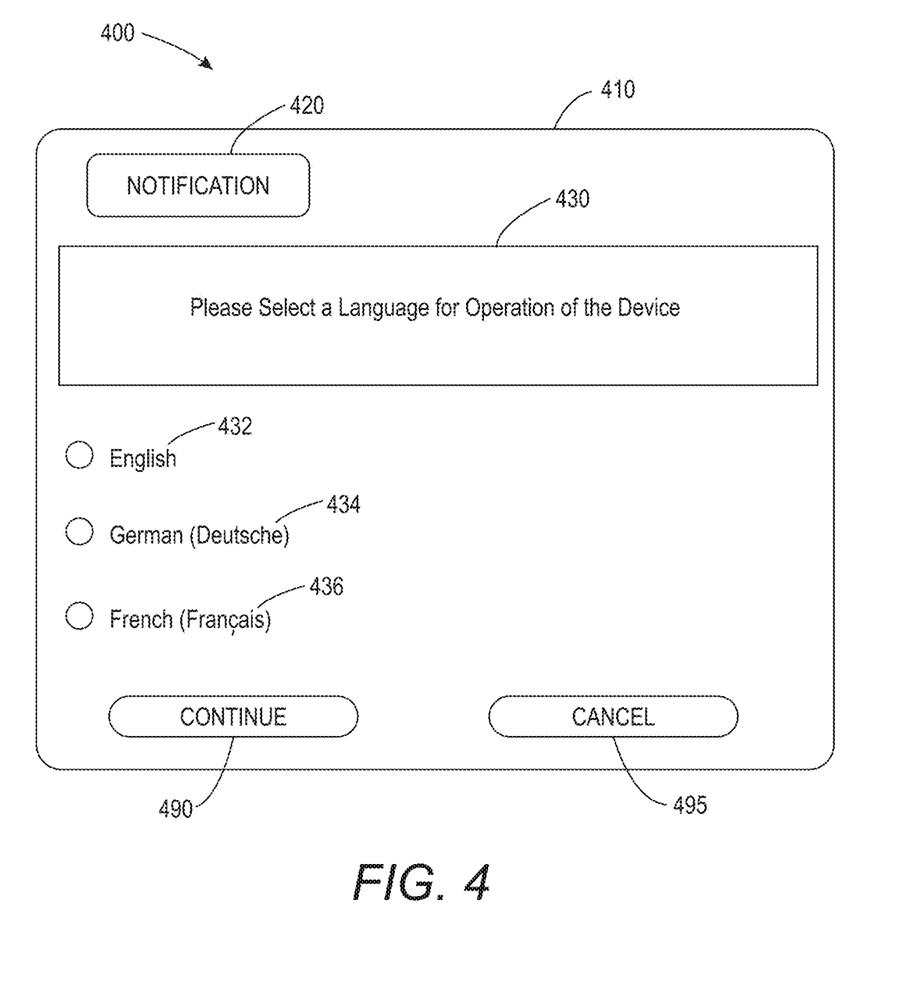
FIG. 4 depicts an exemplary screenshot from a display used as part of managing the language used for documentation in an MFD.

FIG. 4 depicts an exemplary screenshot from a display in a user interface for an initialization menu screen 400 used for managing the language used for documentation in an MFD, such as MFD 200 described in FIG. 2. The display may be included in one or more user interfaces, such as user interface 212. Initialization menu screen 400 is described in relation to one or more of the steps of process 300 described in FIG. 3. Initialization menu screen 400 may also be included as one of the menus displayed part of initialization or first time power-up of the MFD. It is important to note that initialization menu screen 400 may also be used in conjunction with other processes similar to, and/or containing aspects of process 300 in conjunction with managing the language used for printing documentation in a multi-function device.

Initialization menu screen 400 includes a message window 410. Message window 410 includes an identifier block 420. Identifier block 420 indicates that the message is a "NOTIFICATION", although other message identifiers may be displayed in identifier block 420. Message window 410 further includes a message box 430 containing a message. The content of the message displayed in message box 430 may vary depending on the type of message identifier as well as the specific message provided. Message box 430 displays a message related to the selection of a language for use with operation of the MFD and prompts the user for further action. Message box 430 displays the message "Please Select a Language for Operation of the Device".

Message window 410 also includes three radial selection buttons 432, 434, and 436, each including a text identifier for a language selectable by the user. The text identifier may be in a default language (e.g., English) or may be in the language associated with the selection button in combination with, or as an alternative to, the default language. Selection button 432 is identified with text "English", selection button 434 is identified with text "German (Deutsche)", and selection button 436 is identified with text "French (Francais)". After the user selects one or more of the radial selection buttons 432, 434, 436 the user completes the entry and initiates further processing as part of the operation, such as initialization of the MFD, as described above, by selecting the CONTINUE button 490. A CANCEL button 495 is also included to allow for exit from the window 410 without making a selection and/or for return to a previous menu screen on the display.

It is important to note that additional radial selection buttons may be included for other languages available for use in the MFD. Additionally, alternative selection mechanisms may be used in message window 410, such as a pull-down menu, a direct text entry box, a button grid, or any other mechanism well known to those skilled in the art.

Figure 5:
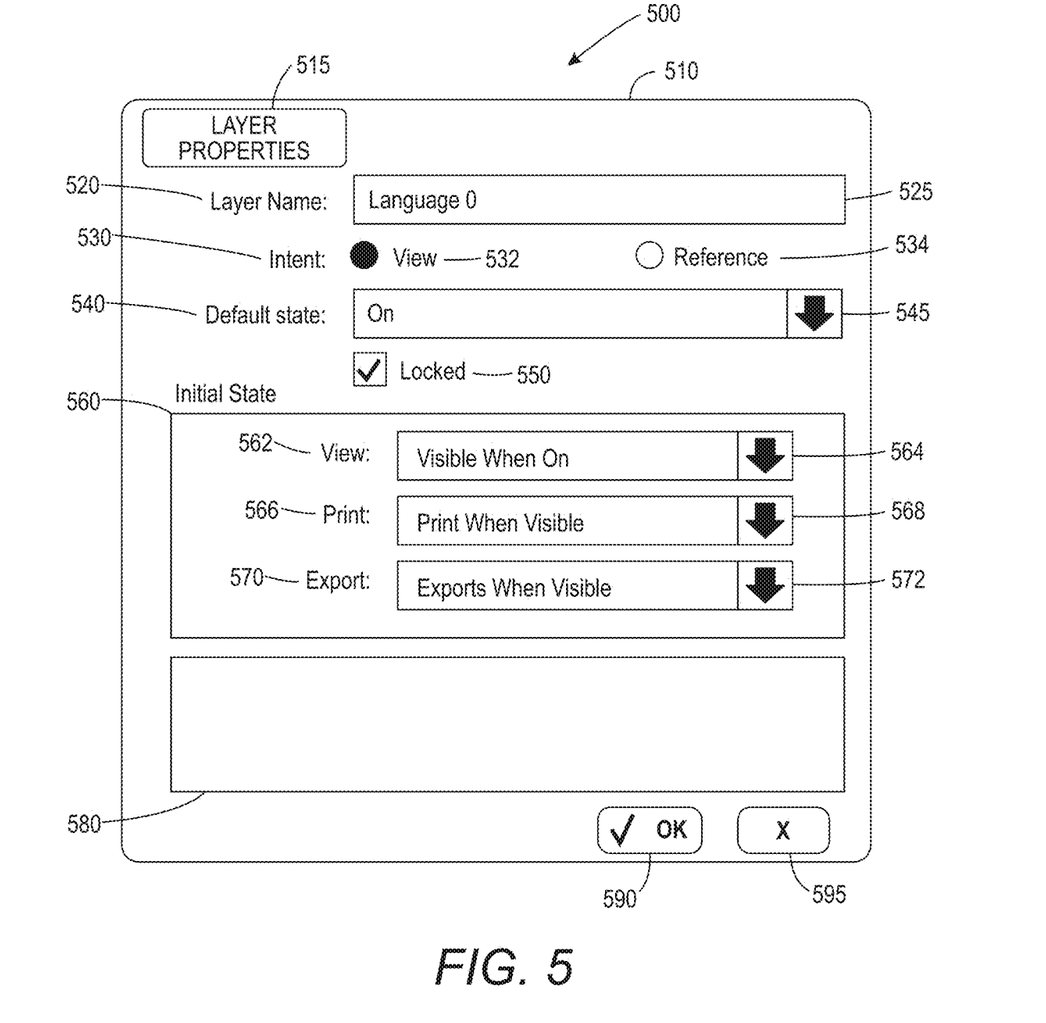
FIG. 5 depicts an exemplary layer management structure used as part of managing the language used for documentation in an MFD.
Figure 6:
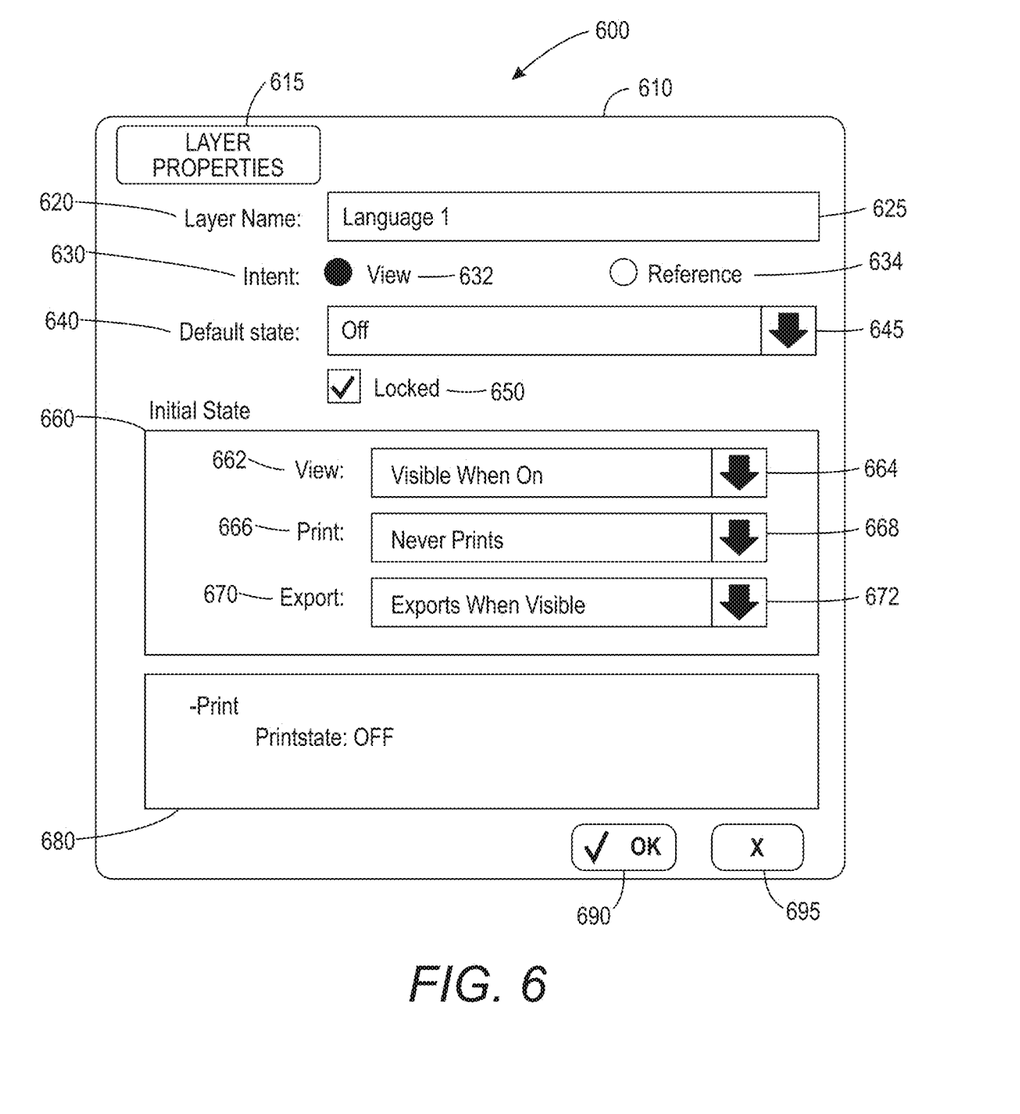
FIG. 6 depicts another exemplary layer management structure used as part of managing the language used for documentation in an MFD.

FIGS. 5 and 6 depicts exemplary layer management structures 500 and 600 used as part of managing the language used for documentation in a multi-function device. Layer management structures 500 and 600 may be generated and directly edited using a content creation program, separate from the MFD, as described above. Layer management structures 500 and 600 illustrate the initial settings associated with properties for the layers associated with languages prior to any language selection mechanism is implemented. Layer management structures 500 and 600 may be included as data or metadata along with the content (e.g., languages and formatting data or scripts) in the electronic file that represents the information pages or other electronic documentation for the MFD, as described above.

Layer management structure 500 includes a layer window 510. Layer window 510 includes an identifier block 515. Identifier block 515 indicates what information is displayed in layer window 510. Identifier block 515 identifies the window as "LAYER PROPERTIES". Other identifiers may be displayed in identifier block 515. Layer window 510 further includes a series of entries for properties or settings associated with a layer. For purposes of this application, the properties and/or settings associated with the layers in a layer managements structure configure the appearance of, or actions taken, of any type with respect to the electronic file when used in or by any application (e.g. a content viewing application) associated with, or used in conjunction with, the electronic file. Layer name element 520 includes an entry box 525 for the name of the layer. Entry box 525 includes the text "Language 0" and is normally associated with the nominal or default language for use with the internal information pages or other documentation represented by the data in the electronic file, as described above. The language 0 layer is initially enabled along with a content formatting layer as part of viewing or printing internal information pages or other documentation in the MFD. Intent element 530 includes two selectable radial buttons, View button 532 and Reference button 534, used to show the use for the layer. View button 532 is selected as indicated. Default state element 540 includes a drop-down box 545 as well as a locked box 550. Drop down box 545 may include several selectable entries, such as On, Off, and the like. Drop down box 545 shows On as selected. Further, locked box 550 shows as checked or selected to indicate that changes to the layer may not be made without editing the layer properties.

Layer window 510 also includes an Initial State entry 560 with a box including several sub-elements that are used to enable or disable the layer under various conditions. A View element 562 includes a drop-down box 564 and controls the conditions required for the layer to be viewed or displayed. A Print element 566 includes a drop-down box 568 controls the conditions required for the layer to be printed. An Export element 570 includes a drop-down box 572 and controls the conditions required for the layer to be exported or externally saved as a different electronic file. Each of the drop-down boxes 564, 568, and 572 may include several selectable entries including, but not limited to, Visible When On, Prints When On, Prints When Visible, Never Prints, Exports When Visible, Exports When On, and the like. Drop down box 564 shows Visible When On as selected. Drop Down box 568 shows Prints When Visible as selected. Drop down box 672 shows Exports When Visible as selected.

Layer window 510 further includes a message box 580. Message box 580 may include comments or other references to data or instructions used as part of managing the language used for documentation in an MFD, as described above. Message box 580 does not contain any information as shown. Layer window 510 additionally includes an OK button 590 to accept any changes made using the content creation program (external to the MFD). A CANCEL button 595 is also included to allow for exit from layer window 510 without making any changes and/or for return to a previous screen or window on the display.

Layer management structure 600 includes a layer window 610 and identifier block 615 with all the same properties as described above for layer management structure 600. Except as described here, all properties and entries for the various elements in layer window 610 are the same as layer window 510 and will not be further described here.

Entry box 625 includes the text "Language 1" and is normally associated with one of the additional languages for use with the internal information pages or other documentation represented by the data in the electronic file, as described above. The Language 1 layer is not initially disabled as part of viewing or printing internal information pages or other documentation in the MFD. As such, entry box 645 shows Off as selected, disabling the use of the language 0 layer. Further, drop down box 668 associated with Print Element 666 shows Never Prints as selected. Message box 680 also includes text indicating that a variable identified as Printstate is set to OFF.

Additional layer management structures may be created or edited using the content creation program (external to the MFD) for any additional languages available for use as part of operations in the MFD. It is important to note that, as part of selecting or enabling a language other than the nominal or default language (e.g., selecting or enabling language 1 instead of language 0) the processor in the MFD (e.g., print processor 224 in MFD 200) may generate instructions to modify the code or metadata included in the layer management structures 500 and 600. For instance, the data associated with the entries for Default State 540 and 645 and Print State 566 and 666 may be switched or reversed in a manner as described above in FIG. 2.

Figure 7:
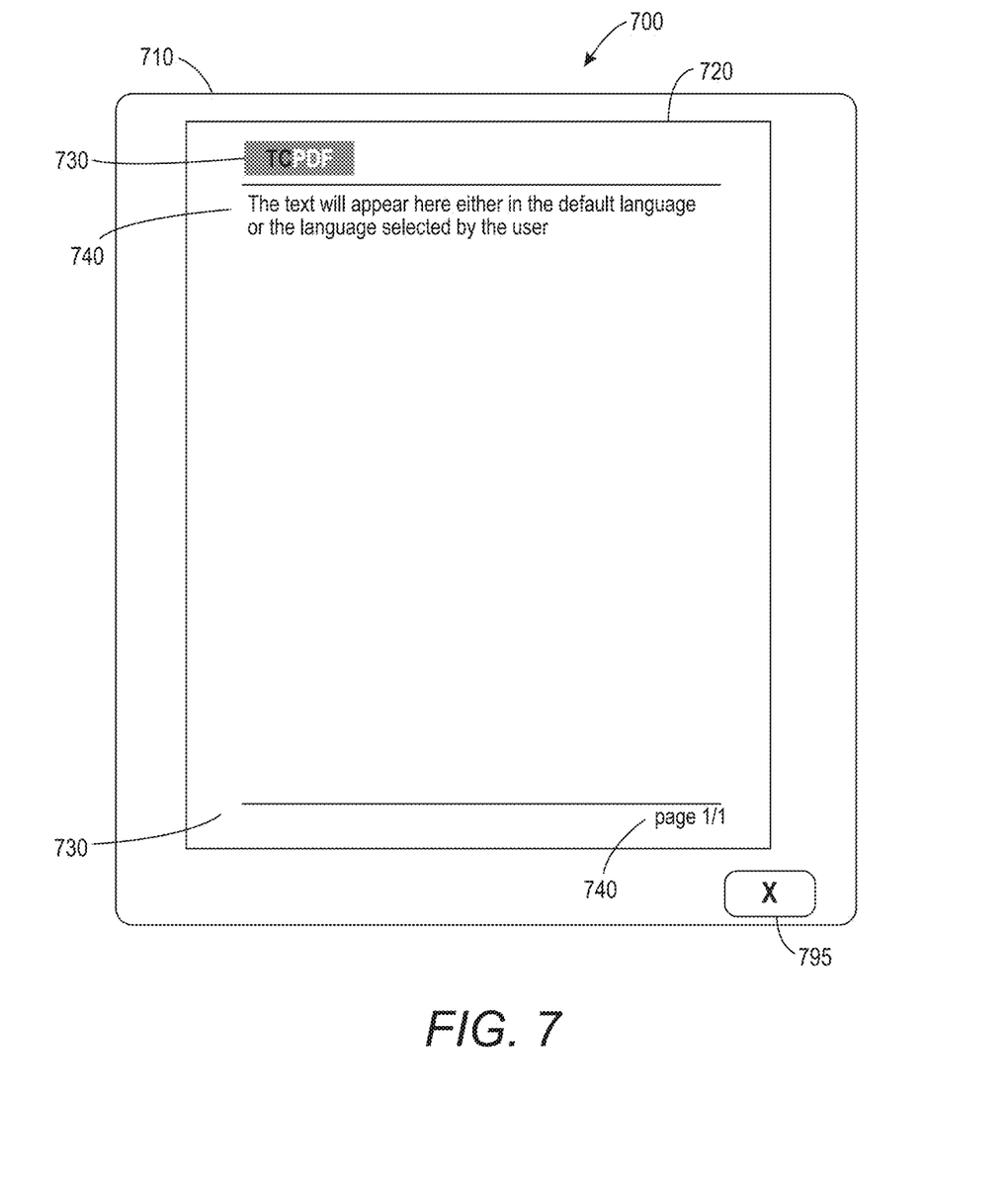
FIG. 7 depicts an exemplary screenshot on a display of a document including aspects of managing the language used for documentation in an MFD.
Figure 8:
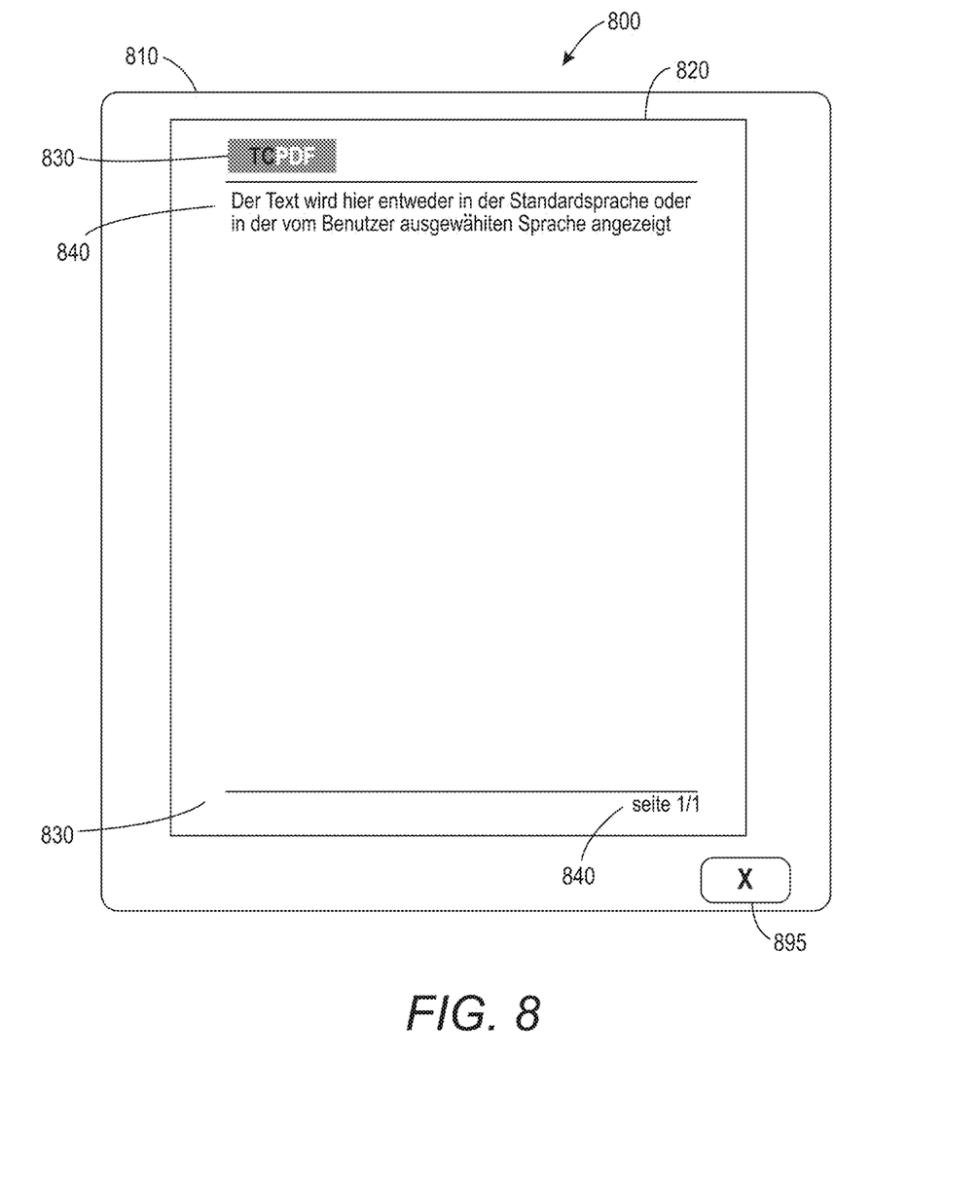
FIG. 8 depicts another exemplary screenshot on a display of a document including aspects of managing the language used for documentation in an MFD.

FIGS. 7 and 8 depict exemplary document display screens 700 and 800 utilizing aspects of managing the language used for documentation in an MFD. One or the other of the document display screens 700 or 800 may be displayed as part of a request for assistance or information as part of the operation of the MFD by a user. The document display screen (either 700 or 800) that is displayed will depend on the language selected by the user, as described above.

Document display screen 700 includes a document display window 710. A document, such as an information page or other internal documentation for an MFD, 720 is displayed in document display window 710. Document 720 displays the information (e.g., text and graphics elements) included in the electronic file used to create document 720 in a print view based on content layers enabled in the metadata for the electronic file, as described above. Document 720 may be displayed in its entirety in document display window 700 or may include some form of navigation to change the display range for information in document 720 (not shown), such as a pagination selection element or a window slider selection element, included as part of document display window 710.

Document 720 includes formatting elements 730. The formatting elements 730 may be electronic data or scripts included in a content layer of the electronic file for document 720. As shown in document 720, formatting elements 730 include the graphic at the top and bottom of the page along with the page number indicator at the bottom of the page. Document 720 further includes text 740. The text 740 is in English, identified, as described above, as the default or primary language for the MFD. The text 740 may be electronic data or scripts included in the default language or language 0 layer of the electronic file for document 720, as described in FIG. 5. As shown in document 720, text 740 includes the text, in English, below the graphic element at the top of the page along with the word "page", in English at the bottom of the page. An X button 795 is also included to allow for exit from the document display screen 700 and return to a previous menu screen on the display. Note that in some embodiments, a print button (not shown) may be included to print document 720 directly from document display screen 700.

Document display screen 800 includes the same features as described above for document display screen 700 with the displayed content modified based on the selection of a language other than the default language in a manner as described above. Document 820 includes formatting elements 830 that are the same as formatting elements 730. Document 820 further includes text 840. The text 840 is in German, the language selected above as the language for use with operations of the MFD. The text 840 may be electronic data or scripts included in the language 1 layer of the electronic file for document 820, as described in FIG. 6. As shown in document 820, text 840 includes the text, in German, below the graphic element at the top of the page along with the word "page", in German, at the bottom of the page.

The terms printer, MFD, or printing device as used herein encompasses any apparatus, such as a digital copier, bookmaking machine, facsimile machine, multi-function machine, etc., which performs a print outputting function for any purpose, including at least the function of printing images of any type based on submitted digital data in any format. The details of printers, printing engines, etc. are well-known and are not described in detail herein to keep this disclosure focused on the salient features presented. The systems and methods herein can encompass systems and methods that print in color or monochrome, or handle color or monochrome image data. All foregoing systems and methods are specifically applicable to electrostatographic and/or xerographic machines and/or processes. Further, the terms automated or automatically mean that once a process is started (by a machine or a user), one or more machines perform the process without further input from any user.

While some of the embodiments have been described in the general context of program modules or nodes that execute in conjunction with an application program that runs on an operating system on a computing device, those skilled in the art will recognize that aspects may also be implemented in combination with other program modules or nodes.

Generally, program modules or nodes include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communication network. In a distributed computing environment, program modules may be located in both local and remote memory storage devices.

Some of the embodiments described above may further be implemented as a computer-implemented process (method), a computing system, or as an article of manufacture, such as a computer program product or computer readable media. The computer program product may be a computer storage medium readable by a computer system and encoding a computer program that includes instructions for causing a computer or computing system to perform example process (es). The computer-readable storage medium is a computer-readable memory device. The computer-readable storage medium can, for example, be implemented via one or more of a volatile computer memory, a nonvolatile memory, a hard drive, a flash drive, a floppy disk, or a compact disk, and comparable media.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

Although embodiments which incorporate the teachings of the present disclosure have been shown and described in detail herein, those skilled in the art can readily devise many other varied embodiments that still incorporate these teachings. Having described preferred embodiments of systems and methods for managing the language used for documentation in an MFD (which are intended to be illustrative and not limiting), it is noted that modifications and variations can be made by persons skilled in the art in light of the above teachings. It is, therefore, to be understood that changes may be made in the particular embodiments of the disclosure which are within the scope of the disclosure as outlined by the appended claims.

What is claimed is:

1. A multi-function device, comprising:
   a user interface that provides a message to a user, the message comprising selection of a language by the user as part of an initialization of the multi-function device; and
   a processor that receives a response to the message from the user interface, the response comprising the selected language, the processor further determining that the selected language does not match a default language in the multi-function device and generating instructions to modify settings in electronic documentation stored in one file in a memory, the electronic documentation being associated with operation of the multi-function device to enable use of the selected language in place of the default language in the electronic documentation.

2. The multi-function device of claim 1, wherein the electronic documentation is arranged in a set of content layers.

3. The multi-function device of claim 2, wherein one content layer of the set of content layers comprises a content formatting layer.

4. The multi-function device of claim 3, wherein at least two additional content layers of the set of content layers comprise data representing text in at least two languages.

5. The multi-function device of claim 4, wherein one additional content layer of the at least two additional content layers comprises data representing text in the default language.

6. The multi-function device of claim 4, wherein the electronic documentation includes metadata identifying only one of the at least two additional content layers to use in conjunction with the content formatting layer while printing the electronic document.

7. The multi-function device of claim 4, wherein the instructions comprise a set of strings of binary data, each one of the strings of binary data corresponding to the at least two additional content layers of the set of content layers, each one of the strings having an identical data size.

8. The multi-function device of claim 1, wherein the electronic documentation is at least one of a user guide, a troubleshooting guide, and help information.

9. The multi-function device of claim 1, wherein the processor further initiates a restart sequence of the multi-function device, the restart sequence completing the modifying of the settings in the electronic documentation using the selected language.

10. The multi-function device of claim 1, wherein the instructions to modify settings in the electronic documentation further enable the electronic documentation associated with the multi-function device to be at least one of viewed and printed in the selected language.

11. A method, comprising:
providing a message to a user, the message comprising a selection to choose a language as part of an initialization of a multi-function printing device;
receiving an input from the user, the input comprising the language chosen by the user;
determining that the language chosen by the user does not match a default language in the multi-function printing device;
modifying code associated with settings in electronic documentation stored in one file in a memory, to enable use of the language chosen by the user during the initialization in place of the default language in the electronic documentation, the electronic documentation providing information to the user for operation of the multi-function printing device; and
at least one of displaying and printing said electronic documentation in the language chosen by the user using said multi-function printing device.

12. The method of claim 11, wherein the electronic documentation is at least one of a user guide, a troubleshooting guide, and help information.

13. The method of claim 11, further comprising initiating a restart sequence of the multi-function printing device, the restart sequence completing the modifying of the code associated with the settings in the electronic documentation to enable use of the language chosen by the user during the initialization.

14. The method of claim 11, wherein the code associated with the settings in the electronic documentation further enable the electronic documentation to be at least one of viewed and printed in the language chosen by the user during initialization.

15. The method of claim 11, wherein the code comprises a set of strings of binary data, each one of the strings of binary data having an identical data size and corresponding to a content layer in the electronic documentation.

16. An apparatus comprising:
a memory storing an electronic file, the electronic file comprising documentation in a set of languages for assisting a user with operation of the apparatus; and
a processor configured to:
generate instructions to provide a message to a user in conjunction with initialization of the apparatus, the message comprising a selection of a language from the set of languages for operation of the apparatus;
receive an input from the user, the input comprising the language selected by the user;
determine that the language selected by the user does not match a default language in the apparatus; and
provide instructions to modify settings to enable the user to at least one of view and print documentation from the electronic file using the language selected by the user.

17. The apparatus of claim 16, wherein the documentation is at least one of a user guide, a troubleshooting guide, and help information.

18. The apparatus of claim 16, wherein the processor is further configured to initiate a restart sequence of the apparatus, the restart sequence completing the modifying of the settings to enable the user to at least one of view and print documentation from the electronic file using the language selected by the user.

\* \* \* \* \*